United States Patent [19]
Lin

[11] Patent Number: 5,740,561
[45] Date of Patent: Apr. 21, 1998

[54] WATER-SAVING STRUCTURE OF TOILET BOWL WATER TANK

[76] Inventor: Yao-Sen Lin, P.O. Box 2103, Taichung City, Taiwan

[21] Appl. No.: 728,912

[22] Filed: Oct. 11, 1996

[51] Int. Cl.⁶ ........................................ E03D 1/14
[52] U.S. Cl. ................................................ 4/326
[58] Field of Search ................................ 4/326, 327

[56] References Cited

U.S. PATENT DOCUMENTS

| | | | |
|---|---|---|---|
| 1,780,810 | 11/1930 | Brown | 4/326 |
| 4,056,856 | 11/1977 | Reid et al. | 4/326 |
| 4,353,138 | 10/1982 | Bell | 4/326 |
| 4,878,256 | 11/1989 | Bagwell | 4/326 |

Primary Examiner—Charles E. Phillips
Attorney, Agent, or Firm—Morton J. Rosenberg; David I. Klein; Jun Y. Lee

[57] ABSTRACT

A water-saving structure of toilet bowl water tank is disclosed. The toilet bowl water tank is disposed with a float ball valve for controlling the incoming of the water and a flush handle for controlling a water-outgoing valve. This handle is disposed with a first and a second pulling arms for respectively pulling two movable valves disposed at the openings of a high level tube and a low level tube. A stopper body serves to restrict the rotational angle of the pulling arms within 45 degrees. The opening of the high level tube is positioned at one half of the full level, while the opening of the low level tube is positioned near the bottom of the water tank. Therefore, the handle can be rotated left or right to control the amount of the water flushing into the toilet bowl. Also, it can be easily installed in the water tank and operated by a user himself without changing the existing structure of the water tank.

15 Claims, 8 Drawing Sheets

WATER-SAVING STRUCTURE OF TOILET BOWL WATER TANK

BACKGROUND OF THE INVENTION

The present invention relates to a water-saving structure of toilet bowl water tank, which is able to control the amount of the flushing water by two stages.

FIG. 8 shows an existing water-saving structure of the conventional toilet bowl water tank, in which two depression keys 72 are disposed on the lid 71 of the water tank 7, whereby by means of depressing the depression keys 72, a level 73 drives a chain 74 to lift a sealing cover 75. In the case of full level, an engaging face 77 of the float body 76 is engaged with the front edge of the sealing cover 75 to keep the water flushing out.

According to the above arrangement, the depression keys 72 are disposed on the lid 71 of the water tank 7 and each depression key 72 is disposed with a spring 721 for restoring the depression key 721 back to its home position. Such measure has the following shortcomings:

1. The lid of the water tank must be additionally perforated for installing the depression keys thereon. Such procedure is quite inconvenient and time-consuming.

2. The depression keys are disposed on the lid of the water tank so that an article (such as a tissue box) can be no more rested on the lid and the space cannot be fully effectively used.

FIG. 9 shows another type of water-saving structure of toilet bowl water tank, in which a valve seat 82 is disposed at the top end of the overflow tube 81. Two L-shaped levers 821, 822 are pivotally disposed in the valve seat 82 and connected to two pulling arms 85 by two chains 84. The pulling arms 85 are pivotally disposed on the water tank 86 for controlling the opening of the sealing covers via a complicated structure.

In the above water-saving structure, the handle can be used to control the valve of the valve seat 82. However, the high and low tubes are disposed in the center of the water tank so that the levers 821, 822 are pulled by two chains 84 to operate the structure. Moreover, the levers 821, 822 have quite complicated structure and are difficult to be installed.

Also, the sealing cover 87 and the float body 88 for controlling the closing of the sealing cover 87 are two separate members so that more interior space of the water tank 86 is occupied. Moreover, it is necessary to consider the opening/closing angle and space of the float body 88 so that the high and low overflow tubes 81 cannot be disposed at a position near the lateral wall of the water tank 86. It only can be disposed at the center of the water tank.

SUMMARY OF THE INVENTION

To solve the above problems, it is a primary object of the present invention to provide a simple water-saving structure of toilet bowl water tank, which can be easily installed in the water tank and operated by a user himself without changing the existing structure of the water tank. Therefore, the space above the water tank can be still used for resting an article on the water tank.

It is a further object of the present invention to provide the above water-saving structure which is applicable to a pulling type water tank located at a higher position.

The present invention can be best understood through the following description and accompanying drawing, wherein:

DETAILED DESCRIPTION OF THE PREFERRED EMBODIMENTS

Figure 1:
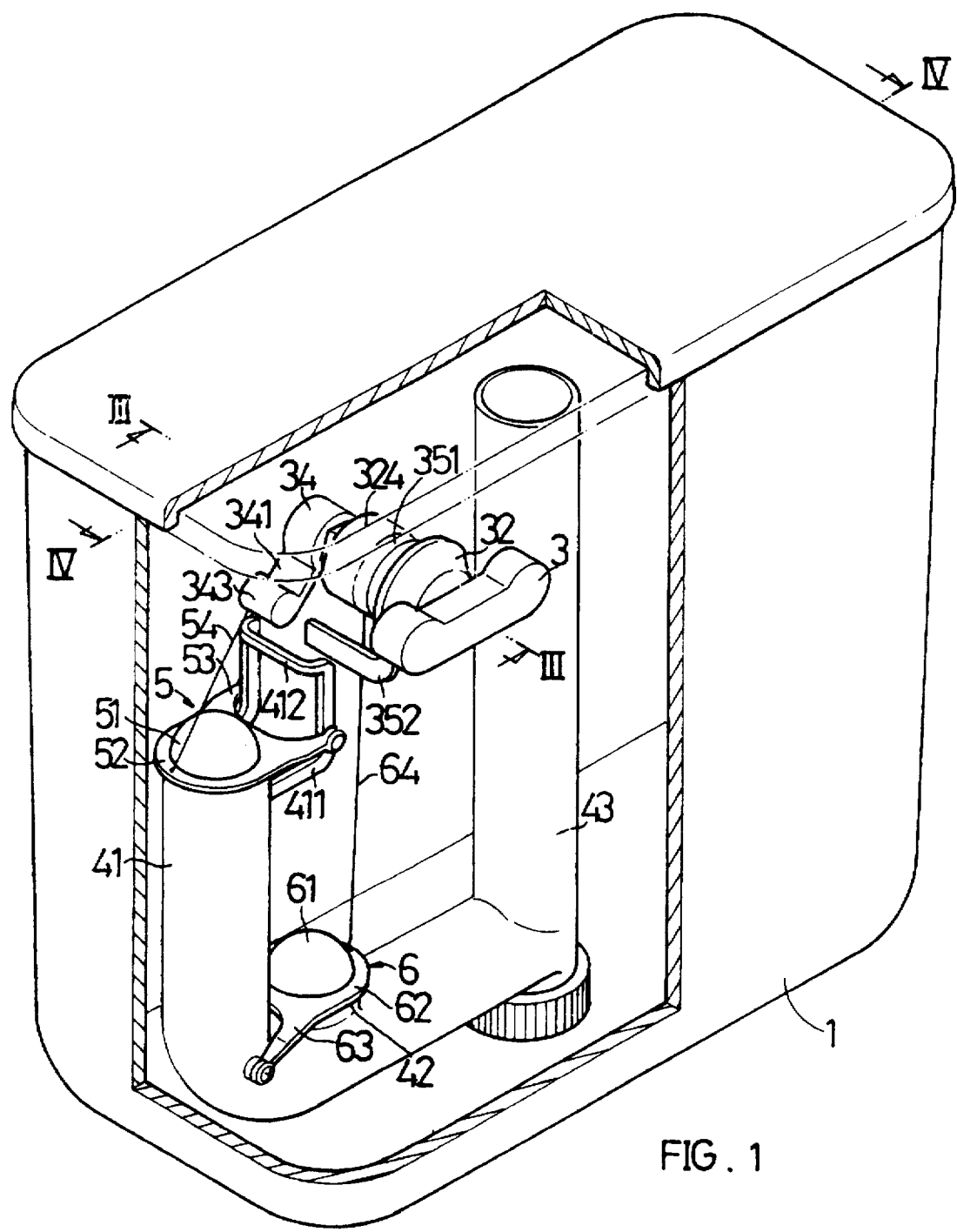
FIG. 1 is a perspective partially sectional view of a first embodiment of the present invention.

Please refer to FIG. 1. According to a first embodiment of the present invention, the water-saving structure is applicable to a general toilet bowl water tank 1 which is disposed with a float ball valve 2 (shown in FIG. 4) for controlling the incoming of the water and a flush handle 3 for controlling a water-outgoing valve 4.

Figure 2:
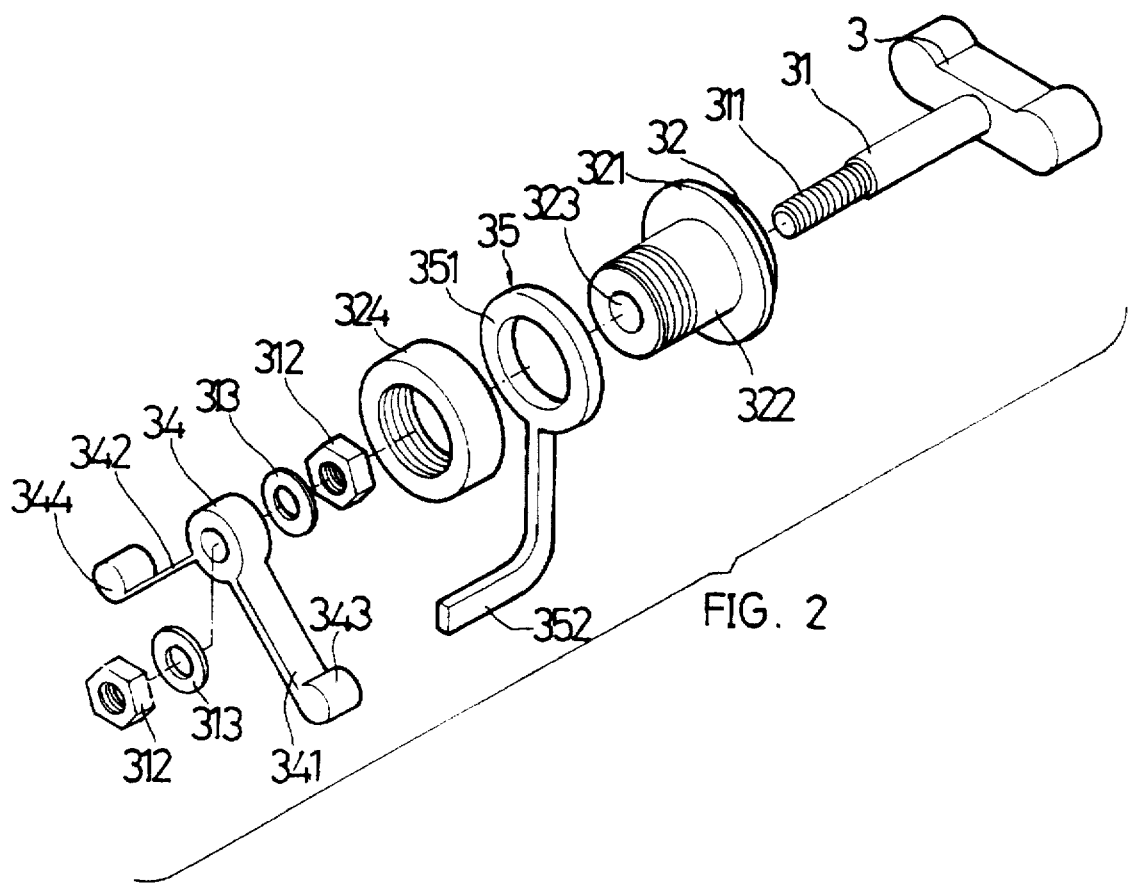
FIG. 2 is a perspective exploded view of the shaft seat and handle of the present invention.
Figure 3:
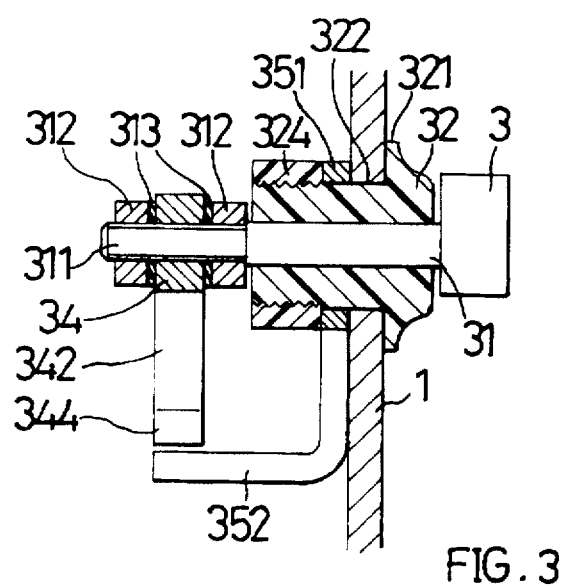
FIG. 3 is a sectional view taken along line III—III of FIG. 1.

Referring to FIGS. 1 to 3, the handle 3 and shaft seat 32 are disposed on the front side of the water tank 1. The shaft seat 32 has a large diameter section 321, a small diameter section 322 and a shaft hole 323. The small diameter section 322 is passing into a through hole of the water tank 1 with the large diameter section 321 abutting against outer wall of the water tank 1. The small diameter section 322 is disposed with a outer thread, whereby a ring seat 351 of a stopper body 35 is fitted around the small diameter section 322 and a nut 324 is screwed on the outer thread to secure the stopper body 35 between the inner wall of the water tank 1 and the nut 324. The stopper body 35 has an L-shaped lever 352 downward extending from the ring seat 351.

The handle 3 has a shaft rod 31 extending, into the shaft hole 323 of the shaft seat 32 with a small diameter thread section 311 protruding out of the shaft seat 32. A nut 312 and a washer 313 are screwed around the thread section to secure the handle 3 in the shaft seat 32 without axial displacement. A V-shaped lever 34 is fitted around the shaft rod 31 and swingably secured thereon by a nut 312 and a washer 313. The swinging path of the V-shaped lever 34 just touches the transverse lever of the L-shaped lever 352 of the stopper body 35.

The V-shaped lever 34 has a first pulling arm 341 and a second pulling arm 342 spaced by 90 degrees. A bulge section 343, 344 is disposed at the free end of each of the two pulling arms 341, 342, whereby the V-shaped lever 34 can naturally suspend with the center line between the two pulling arms normal to the ground. Therefore, the transverse lever of the L-shaped lever 352 can stop and restrict the first and second pulling arms 341, 342 to rotate left or right within 45 degrees.

Please refer to FIGS. 1 to 4. The water-outgoing valve 4 is disposed with multiple longitudinally arranged tubes including a high level tube 41, a low level tube 42 and a relieving tube 43. The opening of the high level tube 41 is positioned at one half of the full level, the opening of the low level tube 42 is positioned near the bottom of the water tank 1, while the opening of the relieving tube 43 is positioned above the full level. The low level tube 42 is disposed between the high level tube 41 and the relieving tube 43, whereby the high and low level tubes 41, 42 are adjacent to each other and can be controlled by the handle 3. The bottoms of the three tubes 41, 42, 43 are communicated with each other and the bottom of the relieving tube 43 is directly communicated with the water outlet of the water tank 1.

A first movable valve 5 is disposed at the opening of the high level tube 41. The first movable valve 5 includes a hollow ball body 51 inserted in a close Ting 52. The bottom of the close ring 52 just totally contacts with the opening of the high level tube 41. A linking lever 53 extends from the close ring 52 and is pivotally disposed on the shaft seat 411 of the opening of the high level tube 41. The shaft seat 411 extends outward upward from outer side of the high level tube 41. A stopper body 412 is disposed at the top end thereof for restricting the rotational angle of the close ring 52 within 45 degrees. A cord 54 is connected between the top face of the close ring 52 and the first pulling arm 341 of the handle 3.

A second movable valve 6 is disposed at the opening of the low level tube 42. The second movable valve 6 includes a hollow ball body 61 inserted in the close ring 62. The bottom face of the close ring 62 just totally contacts with the opening of the low level tube 42. A linking lever 63 extends from the close ring 62 and is pivotally disposed on the outer side of the adjacent high level tube 41. The outer periphery of the close ring 62 and the high level tube 41 restrict the rotational angle of the close ring 62 within 45 degrees. Another cord 64 is connected between the close ring 62 and the second pulling arm 342 of the handle 3.

Figure 4:
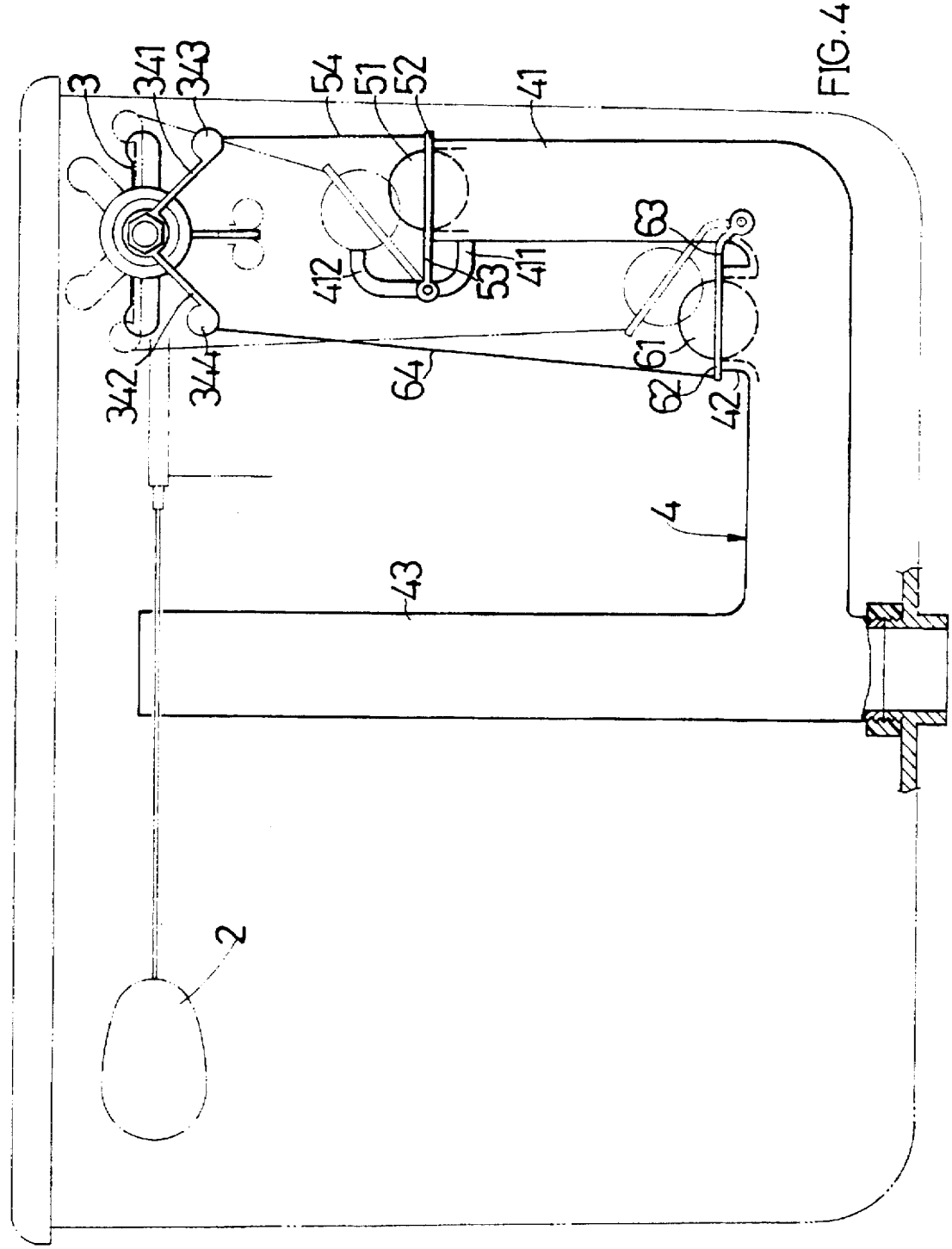
FIG. 4 is a sectional view taken along line IV—IV of FIG. 1, showing the operation of the present invention.

According to the above arrangement, in the direction as shown in FIG. 4, the handle 3 is counterclockwise rotated to make the first pulling arm 341 move upward so as to pull the cord 54 and directly pull open the first movable valve 5 of the high level tube 41, making the hollow ball body 51 abut against the stopper body 41. At this time, the first movable valve 5 is subject to the buoyancy of the hollow ball body 51 and floats, whereby the water can go into the high level tube 41. Reversely, the handle 3 can be clockwise rotated to make the second pulling arm 342 move upward to pull the cord 64 so as to directly pull open the second movable valve 6 of the low level tube 42 to make the close ring 62 abut against the outer side of the high level tube 41. At this time, the second movable valve 6 is subject to the buoyancy of the hollow ball body 61 and floats, whereby the water can go into the low level tube 42.

It should be noted that when the water flows into the high level tube 41, the relieving tube 43 serves to relieve the flushing pressure of the water so as to prevent the pressure from flushing open the second movable valve 6 of the low level tube 42. When the first or second movable valve 5, 6 is pulled open, the hollow ball body 51 or 61 floats in the water. When the water gradually flows into the high level or low level tube 41 or 42, the hollow ball body 51 or 61 will gradually close the opening thereof. When the level of the water is at the same height as the opening, the hollow ball body 51, 61 will totally cover the opening via the close ring 52, 62. At this time, the water can be further filled in and by means of the water pressure, the close ring 52, 62 and the hollow ball body 51, 61 are depressed without floating up.

According to the present invention, it is unnecessary to perforate the existing water tank and any user can install the present invention in a water tank by himself without expertise.

Figure 5:
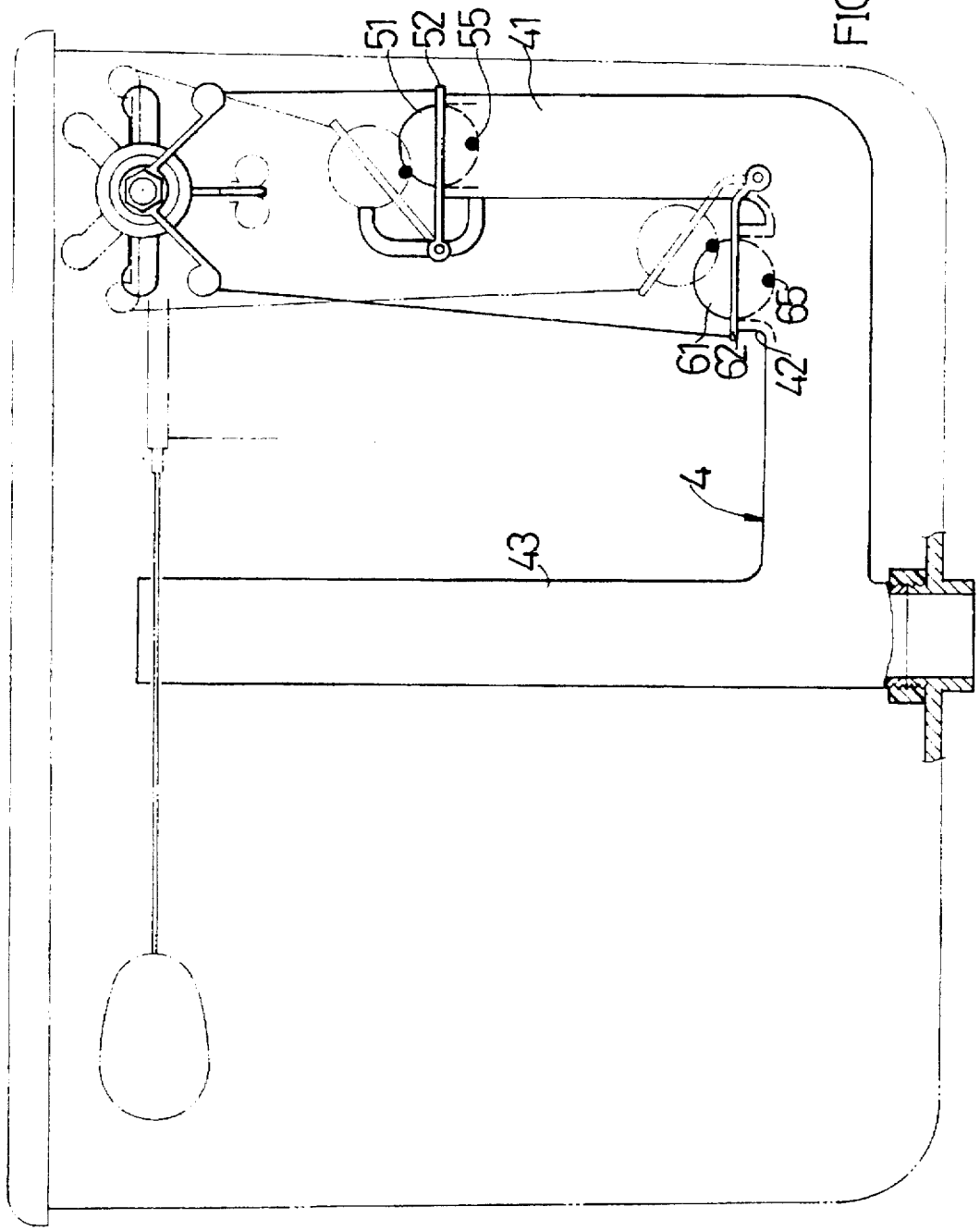
FIG. 5 is a sectional view of a second embodiment of the present invention.

Many modifications can be derived from the above embodiment. For example, referring to FIG. 5, a rolling body 55, 65 with a specific weight can be additionally disposed inside the hollow ball body 51, 61. By means of the weight and rolling movement of the rolling body 55, 65, the close ring 52, 62 can also close the opening of the tube.

Figure 6:
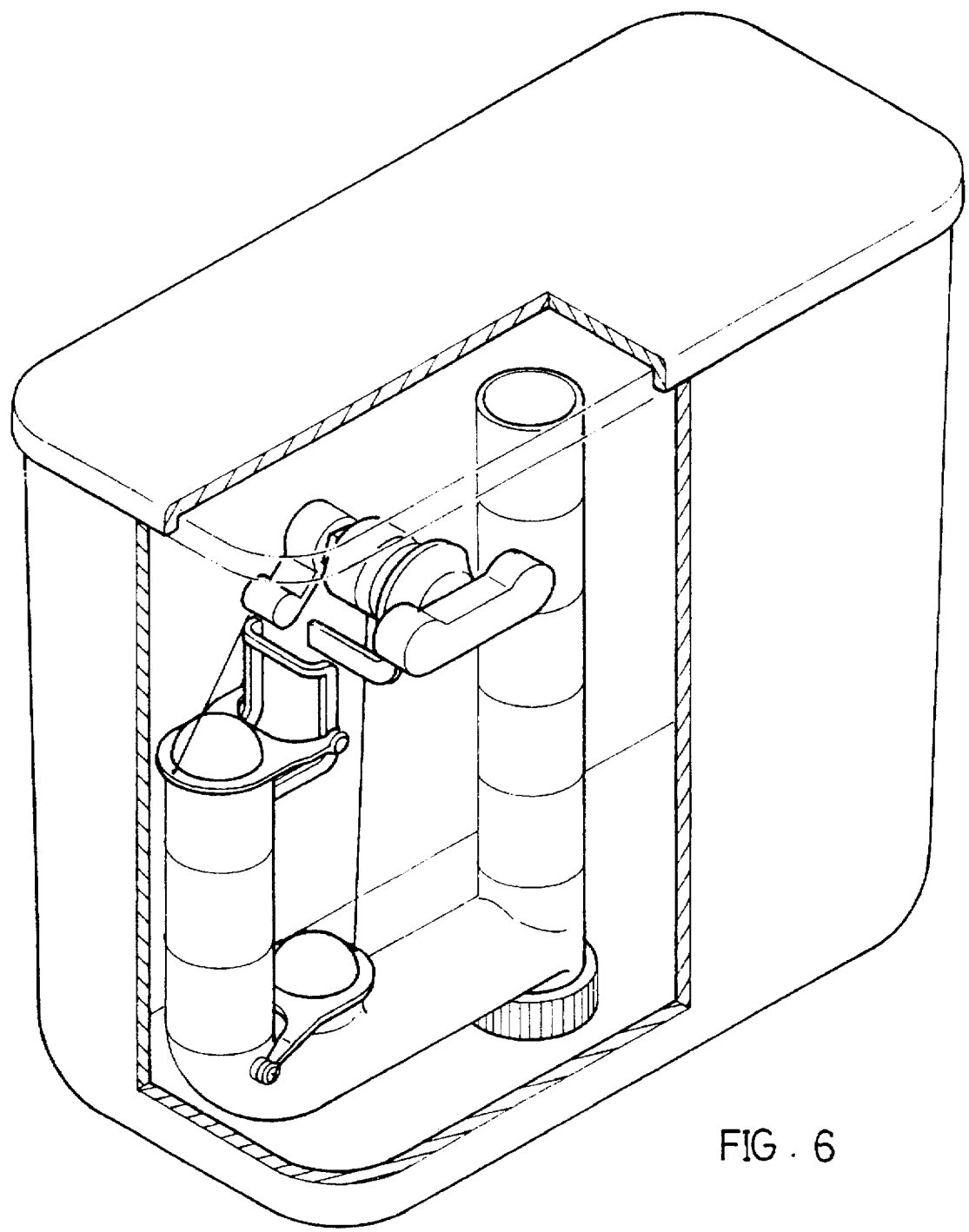
FIG. 6 is a perspective partially sectional view of a third embodiment of the present invention.

In addition, referring to FIG. 6, the high level tube, low level tube and the relieving tube can be composed of several shorter tubes by stacking. Therefore, the number of the shorter tubes and the height after stacking can be adjusted in accordance with the height of the water tank.

Figure 7:
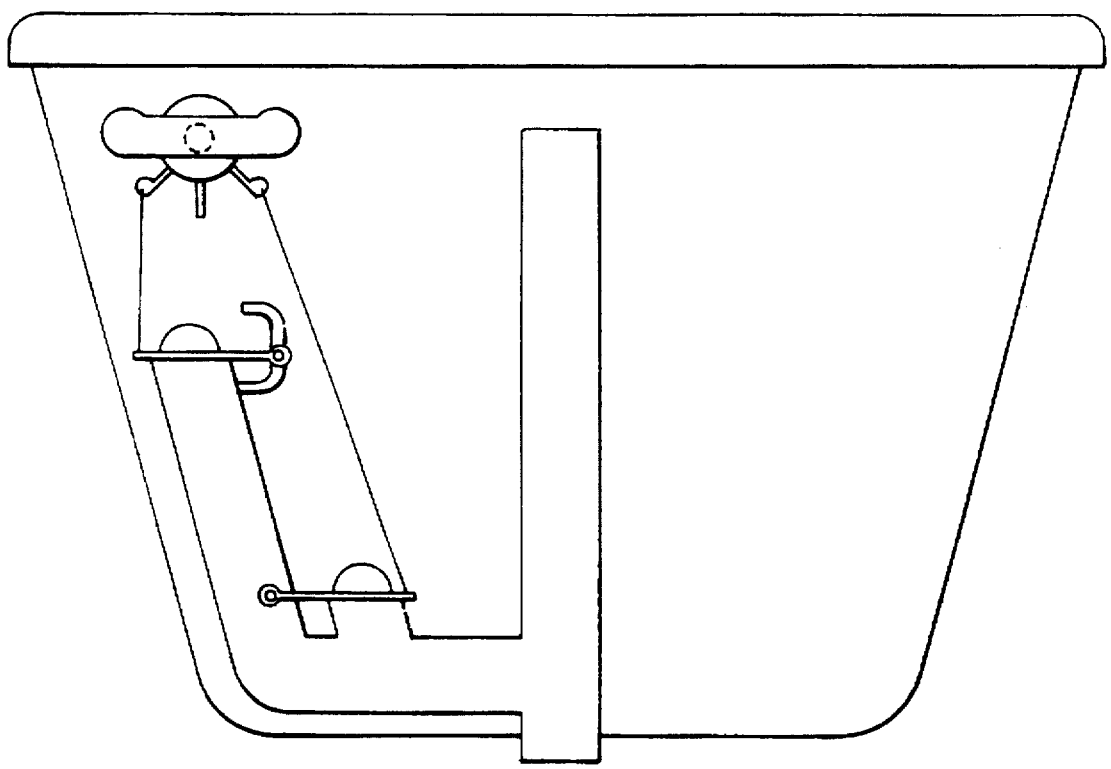
FIG. 7 is a plane view of a fourth embodiment of the present invention.
Figure 8:
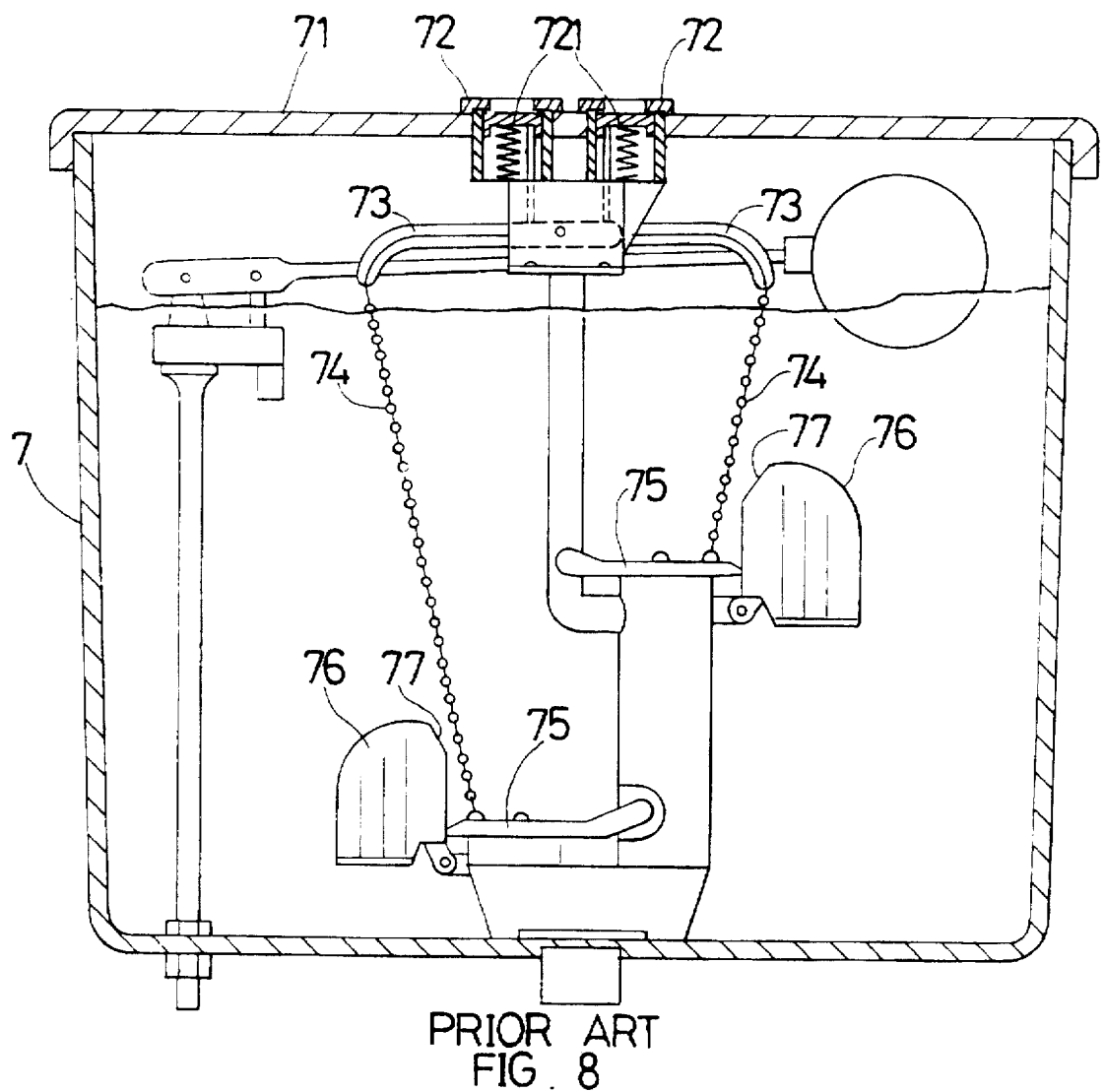
FIG. 8 is a sectional view of a conventional water-saving structure of toilet bowl water tank.
Figure 9:
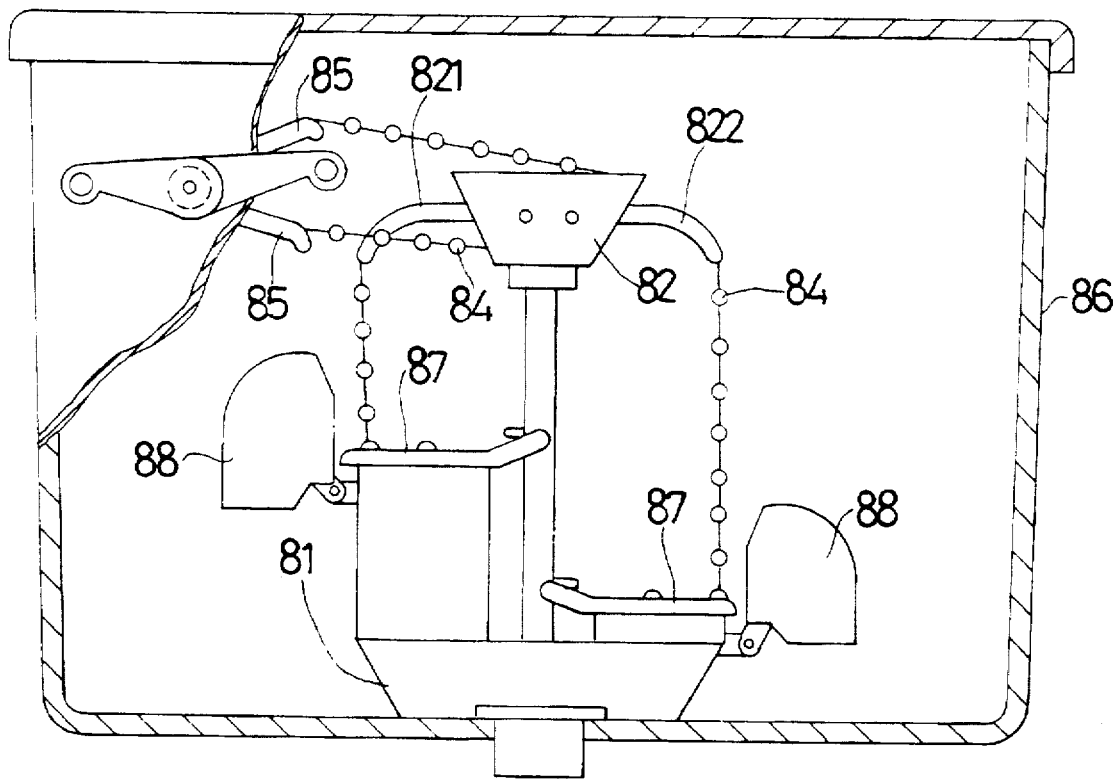
FIG. 9 is a sectional view of another conventional water saving structure of toilet bowl water tank.

Furthermore, referring to FIG. 7, the high level tube, low level tube and the relieving tube can be designed as inclined tubes in accordance with the profile of wide top face and narrow bottom face of the water tank.

With respect to a water tank integrally formed with the toilet bowl, the shaft seat and the handle can be disposed on the left or right outer side of the water tank. Alternatively, a pulling cord can be disposed at each end of the handle for installing the water tank at a higher position. Also, the cords connected between the first and second pulling arms and the first and second movable valves can be chains.

It is to be understood that the above description and drawings are only used for illustrating some embodiments of the present invention, not intended to limit the scope thereof. Any variation and derivation from the above description and drawings should be included in the scope of the present invention.

What is claimed is:

1. A water-conserving flush system for a toilet water tank of a predetermined water capacity having a water inlet and a water outlet, said flush system comprising:
   (a) an outlet valve assembly disposed in said toilet water tank, said outlet valve assembly including:
      (1) a tube structure having a high level tube portion, a low level tube portion, and an overflow tube portion in open communication one with the others, said tube structure having an outlet portion connected to said water outlet of said toilet water tank, each of said tube portions having an opening, said opening of said high level tube portion being disposed relative to a height dimension within said toilet water tank at a position intermediate the position of the full water level when said toilet water tank is filled to said predetermined water capacity and the position of said water outlet, said opening of said low level tube portion being disposed relative to said height dimension at a position intermediate said position of said high level tube portion opening and said position of said water outlet, said opening of said overflow tube portion being disposed relative to said height dimension at a position above said full water level position; and,
      (2) first and second actuable valves coupled respectively to said high and low level tube portions adjacent said openings thereof, said first and second valves releasably sealing said high and low level tube portion openings; and,
   (b) an actuation assembly coupled to said outlet valve assembly for selectively actuating the release of water from said toilet water tank through said outlet valve assembly, said actuation assembly including:
      (1) a flush handle coupled to the exterior of said toilet water tank, said flush handle having a shaft rod portion extending along an axis into said toilet water tank;
      (2) a shaft seat coupled to said toilet water tank, said shaft seat coaxially receiving therethrough said flush handle shaft rod portion;

(3) V-shaped pulling lever mounted on said flush handle shaft rod portion, said pulling lever having first and second pulling arms extending radially outwardly and downwardly therefrom, said pulling lever being pivotally displaceable about said axis of said flush handle shaft rod portion responsive to actuation of said flush handle;

(4) a stopper body coupled to said shaft seat, said stopper body having a lever arm extending therefrom, said lever arm extending between said first and second pulling arms of said pulling lever for limiting said pivotal displacement of said pulling arms to a displacement range of approximately 45 degrees; in either direction from a rest position and, (5) first and second cords for connecting respectively said first and second pulling arms of said pulling lever respectively to said first and second actuable valves of said outlet valve assembly, whereby said first and second actuable valves are respectively actuated in predetermined manner responsive to said pivotal displacements of said first and second pulling arms.

2. The water-conserving flush system as recited in claim 1 wherein said shaft seat includes axially opposed large and small diameter sections and a shaft hole passing axially therethrough, said large diameter section externally engaging said toilet water tank, said small diameter section extending from said large diameter section into said toilet water tank, said small diameter section having a threaded portion.

3. The water-conserving flush system as recited in claim 2 wherein said stopper body includes a ring seat portion, said ring seat portion coaxially engaging said small diameter section of said shaft seat, said actuation assembly further including a nut matingly engaging said threaded portion of said small diameter section for capturing said stopper body.

4. The water-conserving flush system as recited in claim 3 wherein said shaft rod portion of said flush handle has formed thereon a threaded section, said threaded section extending coaxially beyond said shaft seat and said pulling lever.

5. The water-conserving flush system as recited in claim 4 wherein said actuation assembly further includes a first and second locking means coupled to said threaded section of said flush handle shaft rod portion, said first locking means capturing said shaft seat against substantial axial displacement relative to said shaft rod portion, said second locking means capturing said pulling lever against substantial axial displacement relative to said shaft rod portion.

6. The water-conserving flush system as recited in claim 5 wherein said first and second pulling arms of said pulling lever are angularly offset by approximately 90 degrees, each said pulling arm having a free end and a bulge section formed adjacent said free end.

7. The water-conserving flush system as recited in claim 6 wherein said pulling lever is biased to a rest position, said lever arm of said stopper body extending along a plane substantially bisecting said angular offset of said first and second pulling levers when said pulling lever is disposed in said rest position.

8. The water-conserving flush system as recited in claim 1 wherein each of said first and second actuable valves includes:

(a) a buoyant ball body adapted to substantially block one of said high and low level tube portion openings; and, (b) lever means coupled to one of said cords for displacing said ball responsive in said predetermined manner to said pivotal displacement of said lever arms of said pulling lever, said lever means including a pivotally displaceable close ring portion securely retaining said buoyant ball body, said close ring portion being adapted to contact said one of said high and low level tube openings in substantially flush manner.

9. The water-conserving flush system as recited in claim 8 wherein said lever means of said first actuable valve further includes:

(a) a support structure having a seat portion and a stopper portion, said seat portion being secured to said high level tube portion of said outlet valve assembly tube structure, said stopper portion being adapted to limit said pivotal displacement of said close ring portion to a displacement range of approximately 45 degrees; and, (b) a linking lever portion pivotally coupled to said support structure, said linking lever portion extending from said close ring portion.

10. The water-conserving flush system as recited in claim 9 wherein said support structure seat portion of said first actuable valve lever means projects from and extends substantially parallel to said high level tube portion of said outlet valve assembly tube structure, said stopper portion being disposed relative to said height dimension above said seat portion.

11. The water-conserving flush system as recited in claim 8 wherein said lever means of said second actuable valve further includes a linking lever portion extending from said close ring portion, said linking lever portion being pivotally coupled to said high level tube portion, whereby said pivotal displacement of said close ring portion is limited by abutment thereof against said high level tube portion to a displacement range of approximately 45 degrees.

12. The water-conserving flush system as recited in claim 8 wherein a rolling body is contained within said buoyant ball body.

13. The water-conserving flush system as recited in claim 1 wherein said high level, low level, and overflow tube portions of said outlet valve assembly tube structure each extend in a longitudinal direction.

14. The water-conserving flush system as recited in claim 1 wherein said high level, low level, and overflow tube portions of said outlet valve assembly tube structure each include a plurality of detachable tubular sections.

15. The water-conserving flush system as recited in claim 1 wherein at least one of said high level, low level, and overflow tube portions of said outlet valve assembly tube structure extends in inclined manner.

* * * * *